Sept. 24, 1940.    H. HOLLMANN ET AL    2,215,506
MOTOR VEHICLE DRIVE
Filed March 20, 1939    2 Sheets-Sheet 2
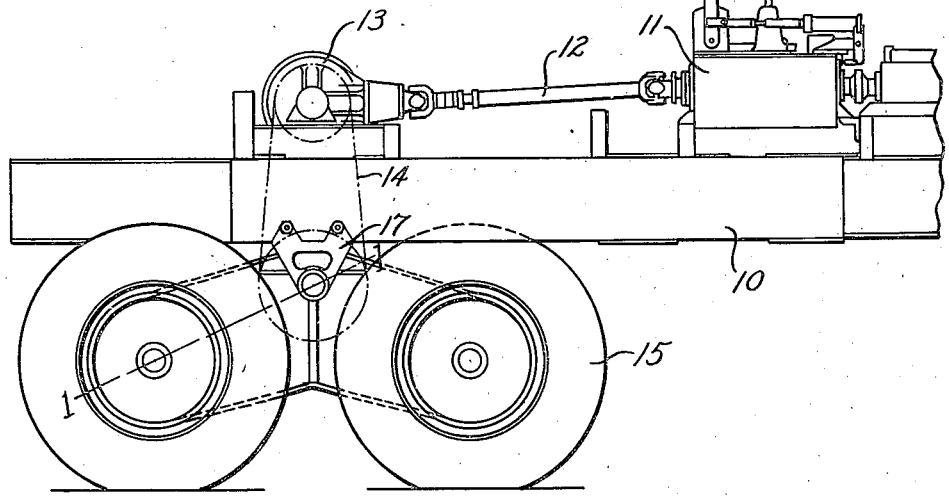
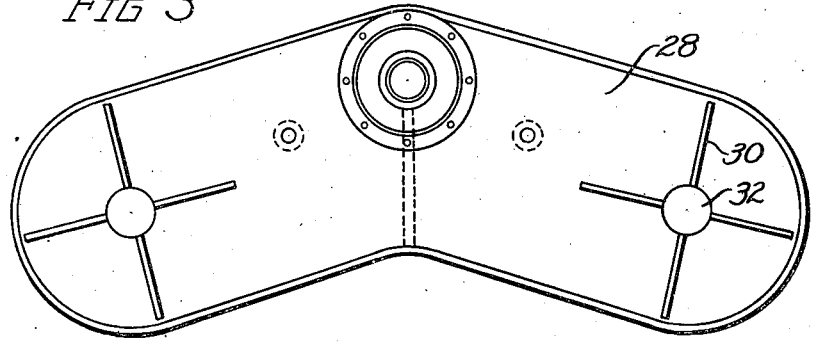
Hubert Hollmann
William G. Van Voorhis
Charles A. Crabiel
INVENTORS
BY
ATTORNEY Patented Sept. 24, 1940

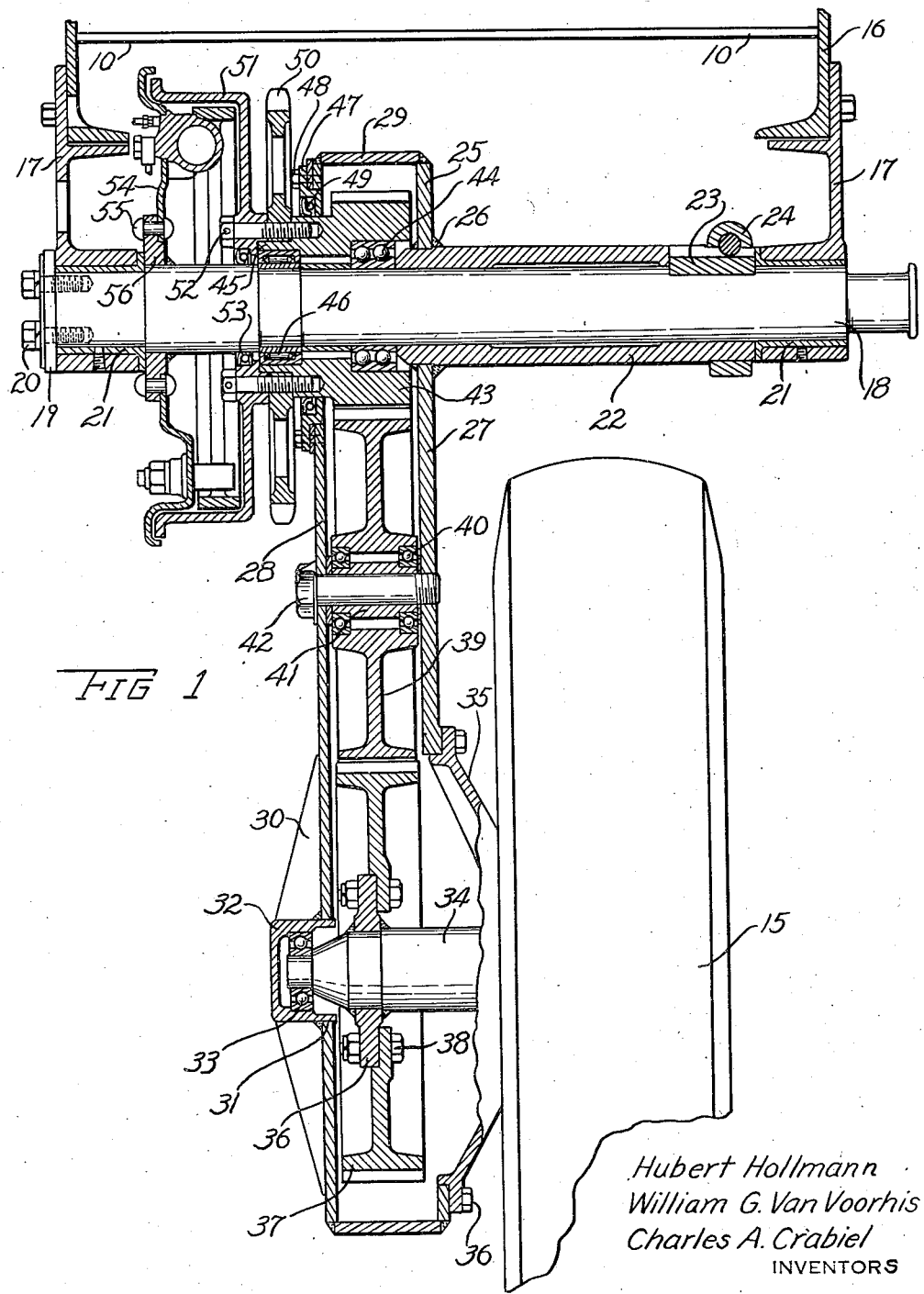

2,215,506

UNITED STATES PATENT OFFICE 2,215,506

MOTOR VEHICLE DRIVE

Hubert Hollmann and William G. Van Voorhis, Findlay, and Charles A. Crabiel, North Baltimore, Ohio, assignors to The Buckeye Traction Ditcher Company, Findlay, Ohio, a corporation of Ohio Application March 20, 1939, Serial No. 263,086

8 Claims. (Cl. 180—22)

This invention relates to motor driven vehicles, but more particularly to a tandem drive in which a plurality of road wheels on each side of the vehicle are driven.

An object of this invention is to produce a new and improved rear axle assembly in which the axle is effectively supported in balanced relation at longitudinally spaced regions, and in which the driving parts are compactly and efficiently arranged.

Another object is to produce a drive of the above character in which the brake parts are so arranged that upon application of the brake the wheels are enabled to accommodate themselves to road irregularities, and are not held by the brake in angular position.

A still further object is to produce a tandem drive for motor driven vehicles in which the unit on one side of the machine is independent of the unit on the other side so that one unit can be replaced readily and conveniently in the event of breakage or when repairs are necessary without disturbing the other unit.

A further object is to provide a tandem drive in which a separate axle is employed for each unit, thereby obviating the disadvantages attendant to the structure heretofore in use in which a single axle is employed for both tandem units.

A further object is to produce a simple and efficient rear axle assembly having the new and improved features of construction, arrangement and operation hereinafter described.

For purposes of illustration but not of limitation, an embodiment of the invention is shown on the accompanying drawings, in which:

Figure 1 is a sectional view of a rear axle assembly for a tandem drive taken on the line 1—1 of Figure 2;

Figure 2 is a side elevation of the rear end portion of a motor vehicle showing the tandem drive arrangement; and Figure 3 is an elevation of the rear face of the gear case.

The illustrated embodiment of the invention shown on Figure 2 comprises a motor vehicle having a frame 10 on which an engine 11 is mounted. The engine 11 is connected by a drive shaft 12 and the usual universal joints to a differential 13, on opposite sides of which is a sprocket and chain connection 14, which, as will hereinafter appear, is operatively connected to drive pairs of road wheels 15, one pair being disposed on each side of the vehicle.

Referring more particularly to Figure 1, the frame 10 is formed on each side with laterally spaced channel beams 16, and secured to each of the beams 16 and depending therefrom are bearing brackets 17. Supported by the bearing brackets 17 and oscillatably mounted therein is a dead axle 18, which has at one end a cap plate 19 secured by bolts 20 to the axle. Bushings 21 are interposed between the bearing brackets and axle respectively. Fitting a portion of the axle 18 is a sleeve 22, which is held rigid with the shaft by a key 23 secured in place by a clamp 24. The sleeve 22 is rigid with a gear case 25, in this instance being secured in place by welding 26.

The gear case 25 comprises an outer plate 27 and a laterally spaced inner plate 28, which are connected by an end plate 29. The end plate 29 may be integral with the plates 27 and 28, but in this instance are shown welded thereto. In the lower portion of the inner plate 28 strengthening webs 30 are formed and an opening 31 is provided to receive a bearing cup 32, which is welded to the plate 28. Within the cup 32 is an anti-friction bearing 33 receiving the inner end portion of a wheel shaft 34 on which the adjacent road wheel 15 is mounted. A substantially frusto-conical plate 35 receives the adjacent wheel shaft 34 and is secured by bolts 36 to the outer plate 27 and encloses an opening formed therein.

As shown in Figure 3, the gear casing is provided with angularly disposed portions, and the description above given of one side portion is deemed sufficient since the other side portion is identical therewith. It will, therefore, be understood that the following description of the drive for one of the road wheels of a tandem unit will be sufficient inasmuch as the adjacent wheel is similarly driven.

Welded to the inner end portion of the wheel shaft 34 is a disc 36, to which a gear 37 is secured by bolt and nut assemblies 38. The gear 37 meshes with a gear 39 which is mounted on ball bearings 40 carried by a sleeve 41, the latter being held in position by a bolt 42, which extends through the inner casing plate 28 and is screw-threaded into the outer casing plate 27.

The gear 39 meshes with a pinion 43, which is mounted on ball bearings 44 on the dead axle 18. The pinion 43 is formed with a lateral extension 45, which is mounted on roller bearings 46. A plate 47 is secured by bolts 48 to the inner casing plate 28 and carries a suitable oil seal 49 embracing the pinion extension at 45. Mounted on the pinion extension 45 is a sprocket wheel 50, which is connected by the above mentioned sprocket and chain connection 14 to the differential 13. On the inner side of the sprocket wheel 50 is a brake drum 51, and securing the brake drum, sprocket wheel and pinion 43 together is a series of bolts 52 so that these parts rotate together. A seal 53 is interposed between the brake drum 51 and axle 18. Cooperating with the brake drum 51 is a brake plate or anchor plate 54 which is secured by rivets 55 to a disc 56. The disc 56 is welded to the axle 18 and is in abutting relation to the bushing 21 at the inner end of the shaft 18. The brake mechanism is of the usual internal expanding type well known to those skilled in this art, and further description thereof is not considered necessary.

It will be understood that the other wheel 15 of the tandem unit is similarly driven from the pinion 43 by a similar chain of gears so that both wheels are conjointly operated. It will further be understood that similar tandem wheel unit is provided on the opposite side of the vehicle, and is driven in the manner above described from a shaft on the other side of the differential 13.

From the above description it will be understood that the dead axle 18 is efficiently supported adjacent its opposite ends and at points spaced longitudinally thereof so that a balanced support is provided. One important advantage of the above described construction is that the brake arrangement is such that when the brake is applied, the wheels 15 can rock relatively to the axle 18 even though the brake is applied with sufficient force to lock or definitely stop rotation of the brake drum 51. This is of advantage in the event that one of the road wheels of a tandem unit encounters an irregularity in the road surface at the time the brake is applied. In similar tandem wheel drives, upon application of the brake with sufficient force the wheels may be locked in a position where one wheel is above the roadway because they are not permitted to oscillate relative to the supporting axle. It will be apparent from the above description that the above objection is overcome since the wheels of a tandem unit can freely rock about the supporting axle during application of the brake.

It is to be understood that numerous changes in details of construction, arrangement and operation may be effected without departing from the spirit of the invention, especially as defined in the appended claims.

What we claim is:

1. In a motor driven vehicle, the combination of a frame having laterally spaced parts, a bearing bracket fixed to and depending from each of said parts, a dead axle mounted for rocking movements in each of said brackets, a gear casing, a sleeve rigid with said gear casing, said axle being mounted within said sleeve, means for causing said sleeve and axle to rock together, a sprocket rotatable on said axle, a gear in said casing and rotatable upon said axle and fixed for rotation to said sprocket, a road wheel assembly supported by said casing, and gearing operatively connecting said gear and road wheel.

2. In a motor driven vehicle, the combination of a frame having laterally spaced parts, a bearing bracket fixed to and depending from each of said parts, a dead axle having bearing in each of said brackets, a sprocket rotatable on said axle, brake members, one of which is fixed for rotation with said sprocket and the other secured to said axle, a gear casing, a sleeve rigid with said gear casing and receiving said axle, a gear in said casing and rotatable upon said axle and fixed for rotation to said sprocket, a road wheel assembly supported by said casing, and gearing operatively connecting said gear and road wheel.

3. In a motor driven vehicle, the combination of a frame, a dead axle having bearing in said frame, a casing fixed to said axle for movement therewith, a road wheel assembly supported by said casing, a driving member rotatable about said axle, an operative connection between said driving member and wheel, a brake drum connected for rotation with said driving member, and an anchor plate cooperating with said brake drum and rigid with said axle.

4. In a motor driven vehicle, the combination of a frame, a dead axle having bearing at longitudinally spaced points in said frame, a wheel support rigid with said axle for turning movements therewith, a road wheel carried by said support, a driving member rotatable upon said axle, an operative driving connection between said member and wheel, a brake drum fixed for rotation with said driving member, and an anchor plate associated with said drum and fixed to said axle.

5. In a motor driven vehicle, the combination of a frame having laterally spaced parts, a bearing bracket fixed to and depending from each of said parts, a dead axle mounted for rocking movements in each of said brackets, a wheel support, a sleeve rigid with said support and receiving said axle, a driving member rotatable on said axle, a wheel assembly carried by said support, an operative driving connection between said driving member and wheel assembly, a brake drum fixed for rotation with said driving member, and an anchor plate associated with said drum and fixed to said axle.

6. In a motor driven vehicle, the combination of a frame, an axle supported by said frame and having bearing therein adjacent opposite ends thereof, a casing, a sleeve fixed to said casing and fitting said axle, means for securing said sleeve and axle for causing conjoint movement thereof, a sprocket rotatable upon said axle, a brake drum fixed to one side of said sprocket, an anchor plate adapted to cooperate with said brake drum and fixed to said axle, a gear fixed to the other side of said sprocket, road wheels supported by said casing on opposite sides of said axle, and gearing operatively connecting said gear and said road wheels.

7. In a motor driven vehicle, the combination of a frame, a pair of laterally spaced independent dead axles, means for supporting each axle at longitudinally spaced points on said axles in said frame, a wheel support disposed between said spaced points of support, a wheel support being rigid with each axle for turning movements therewith, a road wheel carried by each of said wheel supports, a driving member arranged between said points of support and rotatable upon each of said axles, an operative driving connection between each of said driving members and the respective road wheel, and means for conjointly operating said driving members.

8. In a motor driven vehicle, the combination of a frame, a pair of laterally spaced independent dead axles, means for supporting each axle at longitudinally spaced points on said axles in said frame, a wheel support rigid with each axle for turning movements therewith, a road wheel carried by each of said wheel supports, a driving member rotatable upon each of said axles, an operative driving connection between each of said driving members and the respective road wheel, a brake drum fixed for rotation with each of said driving members, an anchor plate associated with each drum and rigid with the respective axles, and means for conjointly operating said driving members.

HUBERT HOLLMANN.
WILLIAM G. VAN VOORHIS.
CHARLES A. CRABIEL.